(12) United States Patent
Ho et al.

(10) Patent No.: US 11,063,878 B2
(45) Date of Patent: *Jul. 13, 2021

(54) DETERMINISTIC DISTRIBUTED NETWORK CODING

(71) Applicant: CODE ON NETWORK CODING, LLC, Cambridge, MA (US)

(72) Inventors: Tracey C. Ho, Pasadena, CA (US); Michelle Effros, Pasadena, CA (US)

(73) Assignee: CODE ON NETWORK CODING, LLC, Wellesley, MA (US)

(*) Notice: Subject to any disclaimer, the term of this patent is extended or adjusted under 35 U.S.C. 154(b) by 45 days.

This patent is subject to a terminal disclaimer.

(21) Appl. No.: 16/726,001

(22) Filed: Dec. 23, 2019

(65) Prior Publication Data
US 2020/0136984 A1 Apr. 30, 2020

Related U.S. Application Data

(63) Continuation of application No. 15/958,178, filed on Apr. 20, 2018, now Pat. No. 10,554,569, which is a continuation of application No. 15/609,856, filed on May 31, 2017, now Pat. No. 9,979,666, which is a continuation of application No. 13/940,703, filed on Jul. 12, 2013, now Pat. No. 9,699,104.

(60) Provisional application No. 61/672,208, filed on Jul. 16, 2012.

(51) Int. Cl.
*H04L 12/811* (2013.01)
*H04W 4/38* (2018.01)
*H04L 1/00* (2006.01)

(52) U.S. Cl.
CPC ............ *H04L 47/38* (2013.01); *H04L 1/0041* (2013.01); *H04L 1/0076* (2013.01); *H04W 4/38* (2018.02); *H04L 2001/0097* (2013.01)

(58) Field of Classification Search
CPC ..... H04L 47/38; H04L 1/0041; H04L 1/0076; H04L 2001/0097; H04W 4/38
See application file for complete search history.

(56) References Cited

U.S. PATENT DOCUMENTS

| 9,209,943 B1* | 12/2015 | Firoiu ..................... H04L 1/189 |
| 2010/0199143 A1* | 8/2010 | Sanderovich ..... H03M 13/2972 714/752 |
| 2012/0039343 A1* | 2/2012 | Kim ..................... H04L 1/0041 370/474 |
| 2012/0128009 A1 | 5/2012 | Yang et al. |

(Continued)

OTHER PUBLICATIONS

Communication under Rule 71(3) EPC dated Jan. 28, 2020 for EP Application No. 13819210 filed on Feb. 9, 2015 in the name of Code On Network Coding, LLC. 26 Pages.

(Continued)

*Primary Examiner* — Harry H Kim
(74) *Attorney, Agent, or Firm* — Steinfl + Bruno LLP

(57) ABSTRACT

A network and a communication method are described. The network comprises: source nodes, receiver nodes, and coding nodes. The coding nodes are connected with input links for communication of input signals to the coding nodes and output links for communication of output signals from the coding nodes. The output signals are a linear combination of the input signals. The coefficients of the linear combination are deterministically chosen based on local information available locally at the coding node.

17 Claims, 4 Drawing Sheets

(56) References Cited

U.S. PATENT DOCUMENTS

2013/0308719 A1* 11/2013 Yang .................. H04L 1/009
                                                  375/295
2014/0075270 A1*  3/2014 Kim .................... G06F 11/10
                                                  714/776
2014/0146924 A1*  5/2014 Shattil ............... H04J 13/0003
                                                  375/340

OTHER PUBLICATIONS

Decision to g rant a European patent pursuantto Article 97(1) EPC dated Aug. 6, 2020 for EP Application No. 13819210 filed on Feb. 9, 2015 in the name of Code on Network Coding , LLC. 2 Pages.
Non-Final Office Action for U.S. Appl. No. 16/399,552, filed Apr. 30, 2019 on behalf of Code on Network Coding, LLC, dated Jun. 12, 2020 19 pages.

* cited by examiner

DETERMINISTIC DISTRIBUTED NETWORK CODING

CROSS REFERENCE TO RELATED APPLICATIONS

The present application is a Continuation of U.S. application Ser. No. 15/958,178 filed Apr. 20, 2018, which, in turn, is a Continuation of U.S. application Ser. No. 15/609,856 filed May 31, 2017, now U.S. Pat. No. 9,979,666 issued on May 22, 2018, which, in turn, is a Continuation of U.S. application Ser. No. 13/940,703 filed on Jul. 12, 2013, now U.S. Pat. No. 9,699,104 issued on Jul. 4, 2017, which, in turn, claims priority to U.S. Provisional Application No. 61/672,208, filed on Jul. 16, 2012, all of which are incorporated herein by reference in their entirety. Furthermore, the present application may be related to U.S. Pat. No. 7,706,365, which is incorporated herein by reference in its entirety.

BACKGROUND

Technical Field

Nodes in a computer network can also function as encoders. In particular, a node operating as encoder does not just forward (i.e. relay or replicate) information received from an input link, it also encodes such information. Coding at a node in a network is known as network coding.

Networks can be modeled as graphs with unit capacity directed links, one or more discrete sources, and one or more receivers, as shown in R. Koetter and M. Medard, "An algebraic approach to network coding," IEEE/ACM Transactions on Networking, Vol 11 Issue 5, October 2003, incorporated herein by reference in its entirety. A common communication problem on networks is the multicast connection problem, where all source processes have to be transmitted to each of the receiver nodes.

Description of Related Art

Network coding enables connections that are not possible if limited to forwarding. In particular, it has been shown in R. Ahlswede, N. Cai, S.- Y. R. Li, and R. W. Yeung, "Network Information Flow", IEEE Transactions on Information Theory and vol. 46, pp. 1204-1216 (2000), incorporated herein by reference in its entirety, that it is, in general, not optimal to simply route or replicate the information to be multicast. Rather, by employing coding at the nodes, bandwidth can generally be saved.

A network can be represented as a directed graph, as shown in R. Koetter and M. Medard, "Beyond Routing: An Algebraic Approach to Network Coding", Proceedings of the 2002 IEEE Infocom (2002), incorporated herein by reference in its entirety. The graph comprises source nodes and receiver nodes, where discrete independent random processes (source processes) are observable at one or more of the source nodes and output processes are observable at the receiver nodes. In the above reference, an algorithm for finding a linear coding solution to a given multicast connection problem, using knowledge of the entire network topology, is disclosed.

However, in applications where communication is limited or expensive, it may be preferable to determine each node's behavior in a distributed manner. Determination of node behavior in a distributed manner is based on information available locally at each node and/or minimal control signaling, without requiring centralized coordination or knowledge of the overall network topology.

It has been shown in T. Ho, R. Koetter, M. Médard, D. R. Karger and M. Effros, "The Benefits of Coding over Routing in a Randomized Setting," International Symposium on Information Theory (ISIT) 2003, incorporated herein by reference in its entirety, that the multicast connection problem can be solved in a distributed manner by means of random linear network coding.

It has been shown in T. Ho, S. Jaggi, S. Vyetrenko and L. Xia, "Universal and Robust Distributed Network Codes," Infocom 2011, incorporated herein by reference in its entirety, that the multicast connection problem can be solved with zero-error deterministic distributed network codes, but with impractical complexity and large delay.

SUMMARY

The present disclosure provides systems and methods to solve the multicast connection problem in a distributed manner by means of deterministic linear coding without requiring centralized coordination or knowledge of network topology.

According to an embodiment of the present disclosure, a network is provided. The network comprises: one or more source nodes, wherein source processes are observable at the source nodes; one or more receiver nodes, wherein receiver processes are observable at the receiver nodes; and coding nodes, allowing communication of the source processes to each receiver node of the receiver nodes, the coding nodes being connected with input links for communication of input signals to the coding nodes and output links for communication of output signals from the coding nodes, wherein the output signals are a linear combination of the input signals. In particular, the coefficients of the linear combination (the coding coefficients) are deterministically chosen based on local information available locally at the coding node. By way of example, the coefficients are chosen from a code alphabet (the set of possible values of the coding coefficients) such as a finite or infinite ring or field.

According to another embodiment a network is provided. The network comprises: one or more source nodes, wherein source processes are observable at the source nodes; one or more receiver nodes, wherein receiver processes are observable at the receiver nodes; and coding nodes, allowing communication of the source processes to each receiver node, the coding nodes being connected with input links for communication of input signals to the coding nodes and output links for communication of output signals from the coding nodes, wherein the output signals from a coding node are a linear combination of the input signals and wherein coefficients of the linear combination are deterministically chosen based on an adjustable mapping through a deterministic function.

According to a further embodiment, a communication method is provided. The method transmits processes from one or more sources to each receiver of one or more receivers in a network. The method comprises: providing coding nodes between the one or more sources and the one or more receivers; providing, for each coding node, input links for transmitting input signals to the coding node, and output links for transmitting output signals from the coding nodes, the output signals being a linear combination of the input signals; wherein an overall linear combination of the processes transmitted from the one or more sources present in each signal in the network is specified as a vector of coefficients, each coefficient being deterministically chosen based on local information available locally at the coding node and corresponding to a process to be transmitted from one or more sources, and wherein the vector of coefficients is transmitted through the network and updated at each coding node by applying to the vector of coefficients linear combinations, wherein the linear combinations applied to the vector of coefficients are the same as the linear combinations applied to data transmitted through the network.

According to further embodiments of the present disclosure, in case of suboptimal choices, the coefficients can be adjusted using feedback from the receiver nodes to improve the rate of information delivery.

Therefore, unlike the zero-error codes in the above mentioned T. Ho, S. Jaggi, S. Vyetrenko and L. Xia, "Universal and Robust Distributed Network Codes," Infocom 2011 paper, where the choice of coding coefficients entails complexity and delay that scales exponentially in the number of network nodes, the embodiments of the present disclosure achieve complexity and delay that scales only polynomially in the number of network nodes, by allowing for some possibility of error in the initial deterministic choice of coefficients and using feedback to improve the choice of coefficients.

In particular, prior deterministic network code designs are complex since they restrict their choice of coding coefficients to cases that guarantee success in delivering the information at maximum rate to its intended receivers. However, making such a guarantee without centralized knowledge of the network topology entails high complexity. On the other hand, the embodiments according to the present disclosure differ from these prior designs by removing the a priori guarantee of maximum rate information delivery. By allowing coefficients to be chosen at each node without the above-described requirement of correctness, coefficient choice is greatly simplified. In particular, if the initial deterministic choice is suboptimal, feedback can be used to improve the rate through the use of bidirectional or reverse links.

Since the approach according to the embodiments of the present disclosure does not depend on the network topology, it can be operated in a distributed fashion, and is robust to changes in network topology, including addition or removal of links, nodes, sources or receivers.

The approach according to the present disclosure is useful in environments where networks are adopted, such as computer communications networks (especially overlay networks, ad hoc networks, or sensor networks), and distributed computer systems.

DETAILED DESCRIPTION

A first embodiment of the present disclosure concerns network coding over acyclic subgraphs of networks. Such acyclic subgraphs can be constructed using, for example, the techniques in D. S. Lun, N. Ratnakar, M. Médard, R. Koetter, D. R. Karger, T. Ho, and E. Ahmed, "Minimum-Cost Multicast over Coded Packet Networks," IEEE Transactions on Information Theory, 52 (6), pp. 2608-2623, June 2006, incorporated herein by reference in its entirety. Data from the sources is transmitted over the acyclic subgraph to the receivers. If the network has bidirectional links or additional links in the reverse direction from the receiver nodes to intermediate nodes in the subgraph, feedback from the receivers can be used to improve the rate of information delivery.

Figure 1:
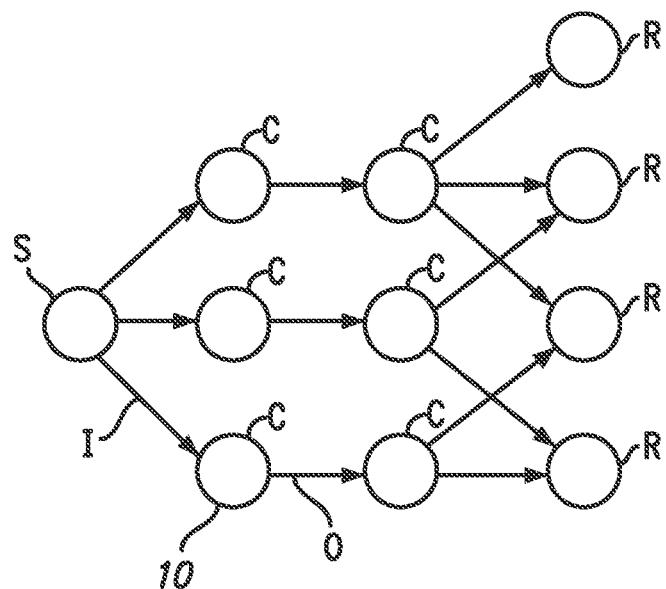
FIGS. 1 and 2 show schematic representations of acyclic networks.
Figure 2:
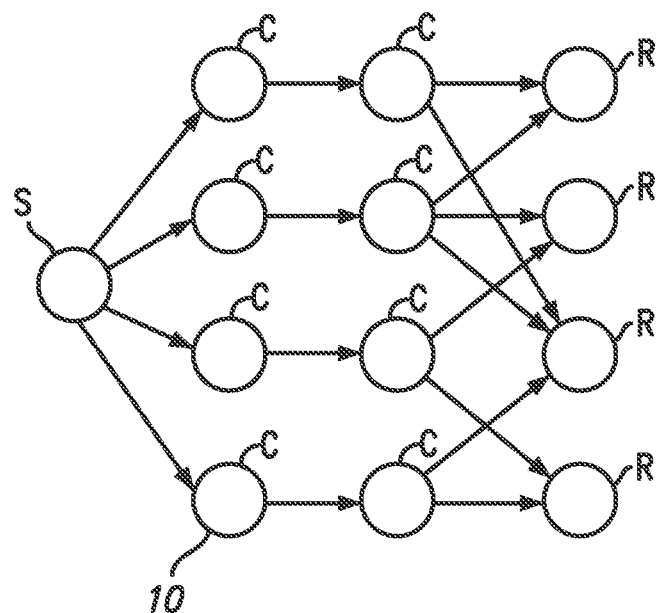

FIGS. 1 and 2 show two examples of acyclic networks having source nodes S and receiver nodes R, and a plurality of intermediate nodes C. The intermediate nodes allow communication of source processes to each receiver node R. The intermediate nodes (see node 10, for example) have input links I and output links O. The input links I communicate input signals to the node 10, while the output links O communicate or transmit output signals from the intermediate nodes.

Figure 3A:
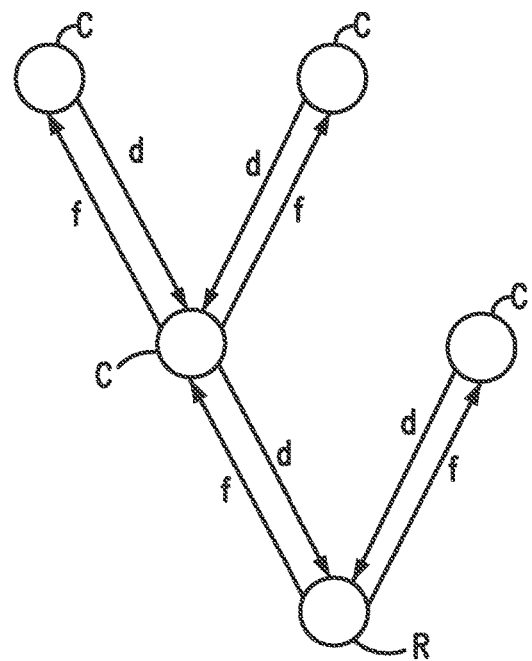
FIGS. 3A and 3B show a further example of network, where reverse (FIG. 3A) or bidirectional (FIG. 3B) links are shown in accordance with an embodiment of the disclosure.
Figure 3B:
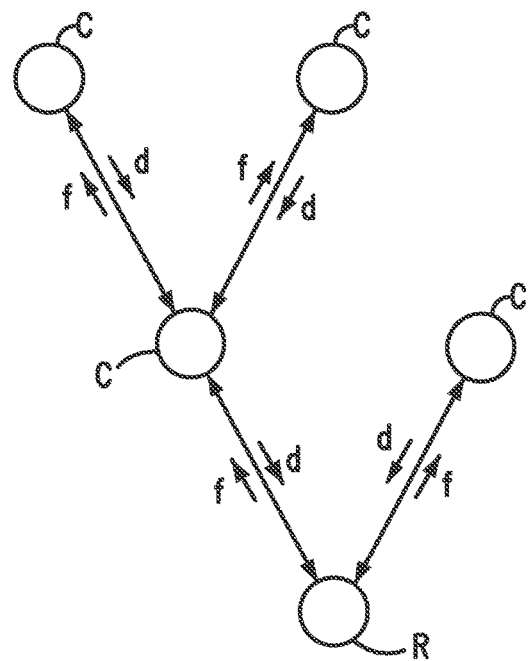

FIGS. 3A and 3B show a further example of network, where reverse (FIG. 3A) or bidirectional (FIG. 3B) links are shown. In particular, FIGS. 3A and 3B show exemplary links carrying data (labeled "d") to a receiver node R, and feedback (labeled "f") being transmitted in the reverse direction. FIG. 3A illustrates forward and reverse links, while FIG. 3B illustrates bidirectional links.

The present disclosure considers approaches in which network nodes deterministically choose coding coefficients in a distributed fashion and transmit on each outgoing link a linear combination of incoming signals, specified by a vector of coding coefficients. The resulting signal is a linear combination of the source processes, so reference will be made to signals and vectors interchangeably in the following. To avoid high complexity, in accordance with several embodiments of the present disclosure, the deterministic coefficient choices are designed to achieve optimal rates in some network topologies. Suboptimal coefficient choices can subsequently be identified and improved using feedback, if desired, through the presence of reverse and/or bidirectional links in the network.

While any deterministic choice of coefficients can be used to obtain a suboptimal solution, not necessarily based on characteristics of nodes and/or links (e.g. using the same deterministic mapping for nodes and/or links and then possibly using feedback to improve the mapping), some properties are generally beneficial in obtaining better rates over a broader range of network types and topologies. This can help to reduce the amount of feedback, or the amount of rate loss when feedback is not used. As an example, in case of nodes with multiple outgoing links, it is generally beneficial for the outgoing links to have linearly independent coding coefficients. Additionally, or in the alternative, it is generally beneficial for outgoing links from different nodes to have linearly independent coding coefficients, as much as feasible, subject to complexity and topology constraints. As another example, if the network experiences packet losses, it is generally beneficial for each outgoing packet from a node to have coding coefficients which are linearly independent over time from coding coefficients of a subsequent outgoing packet from the same node. Example embodiments are given in the following two paragraphs.

In some embodiments of the present disclosure each node is associated with a node number, which can be obtained from some physical characteristics associated to the node (e.g., its location coordinates, IP address, hardware address or serial number) or any arbitrary deterministic numbering of nodes (e.g., if there are N nodes, each node can be assigned an index number from 1 to N in any arbitrary deterministic order). The node numbers can be used as inputs to a deterministic mapping from local node numbers to coding coefficients. Reference can be made, for example, to FIG. 4, which shows exemplary nodes with indexes h, i, j, k of a network, which will be called nodes h, i, j, k respectively, for brevity. As shown in the figure, node i receives links from nodes h and j, while node k receives a link from node i. As also shown in the figure, node j transmits a packet A to node i, while node h transmits a packet B to node i. Node i will transmit a packet C to node k, where C is a linear combination of A and B. In particular, $$C = c_{ijk}A + c_{ihk}B, \quad (1)$$

where $c_{ijk}$ and $c_{ihk}$ are deterministically chosen coefficients. By way of example, $$c_{ijk} = (i + aj + bk) \bmod q, \quad (2)$$

while $$c_{ihk} = (i + ah + bk) \bmod q, \quad (3)$$

where a and b are arbitrary deterministic constant elements from the code alphabet and q is the alphabet size (for a finite alphabet), or a suitably large constant. In other words, (2) and (3) are deterministic mappings from local node numbers i, h, j, k to coding coefficients. If the network experiences packet losses, the coding coefficients associated with each outgoing packet can be made to vary over time by replacing equations (2) and (3) with $$c_{ijk} = (i + aj + bk + t) \bmod q, \quad (2')$$

and $$c_{ihk} = (i + ah + bk + t) \bmod q, \quad (3')$$

respectively, where t can be a local counter or clock signal.

In other embodiments, each link is associated with a link number, which can be obtained from some physical characteristics associated to the link or any arbitrary deterministic numbering of links (analogous to the node numbers described in the paragraph above). The link index numbers can be used as inputs to deterministic functions that map local link numbers to coding coefficients. Reference can be made, for example, to FIG. 5, which shows exemplary links with indexes h, i, j of a network, which will be called links h, i, j respectively, for brevity. As shown in the figure, link i is used transmit packet A, link h is used to transmit packet B, while link j is used to transmit packet C, where packet C is a linear combination of packets A and B. In particular, $$C = c_{ij}A + c_{hj}B, \quad (4)$$

where $c_{ij}$ and $c_{hj}$ are deterministically chosen coefficients. By way of example, $$c_{ij} = (i + aj) \bmod q, \quad (5)$$

while $$c_{hj} = (h + aj) \bmod q, \quad (6)$$

where a is an arbitrary deterministic constant element from the code alphabet and q is the alphabet size (for a finite alphabet), or a suitably large constant. In other words, (5) and (6) are deterministic mappings from local link numbers i, h, j to coding coefficients. Additionally, if the network experiences packet losses, equations (5) and (6) can be modified similarly to what done with equations (2) and (3) above.

In other embodiments, the deterministic functions mapping node or link numbers onto coding coefficients (see, e.g., equations (2), (3), (5) and (6)) can be influenced by feedback from receiver nodes, if bidirectional or reverse links are available. Reference can be made, for example, to FIGS. 3A and 3B shown above. For instance, a number of different deterministic mappings are applied sequentially, and for each, the receiver nodes feed back their received rates to upstream network nodes. The network nodes then choose the mapping with the highest rates. As another instance, feedback from each receiver node indicates the span (or nullspace) of vectors received on different inputs, providing guidance to network nodes on whether to adjust their mappings, based on whether they are receiving/sending vectors outside this span.

In other embodiments, not all nodes employ coding. As one example, if a node has enough available capacity to forward all its received information to each of its next hop neighbors, it does not need to do coding. As another example, a network may comprise some nodes that are equipped with coding capability and others that are not; the latter nodes just do forwarding. In another example scenario, a standard routing algorithm such as I. Kou, G. Markowsky and L. Berman, "A Fast Algorithm for Steiner Trees," Acta Informatica, volume 15, number 2, 1981, is used to choose coefficients corresponding to a non-coded (routing) solution. Network coding is then introduced at a limited number of network nodes based on feedback from receiver nodes on their received rates. An example of such a scheme is given in the following paragraph. Such embodiments can reduce coding overhead in situations where coding is of no or limited benefit.

Figure 4:
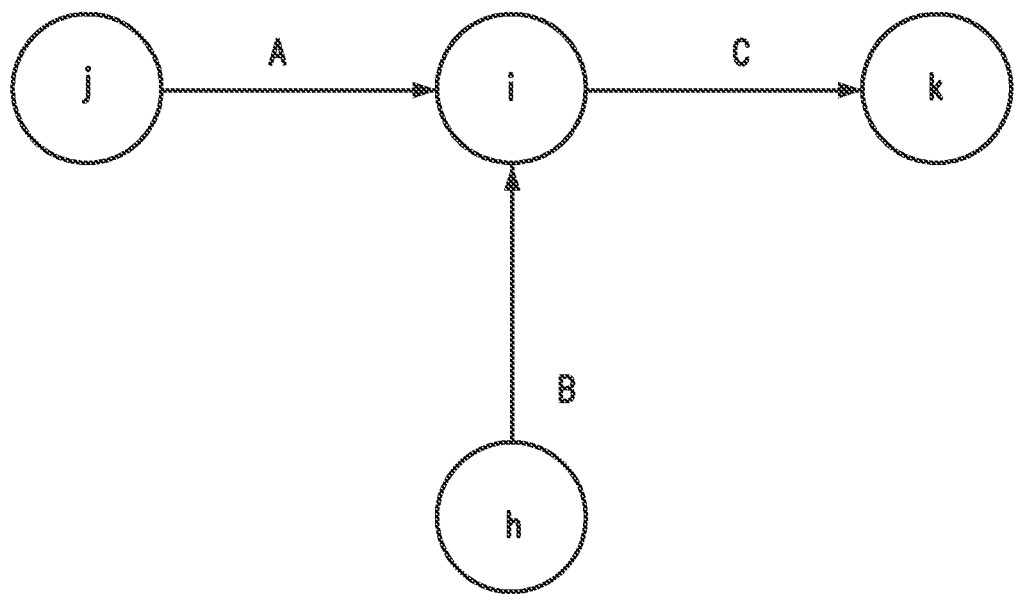
FIGS. 4 and 5 show schematic representations of networks where deterministic choices of coefficients are made.
Figure 5:
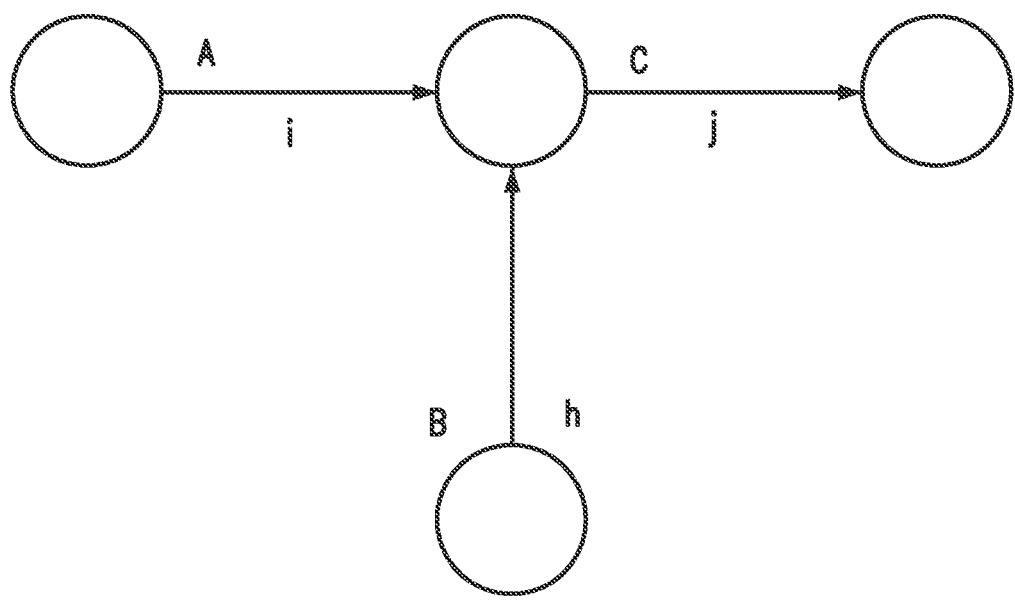
Figure 6:
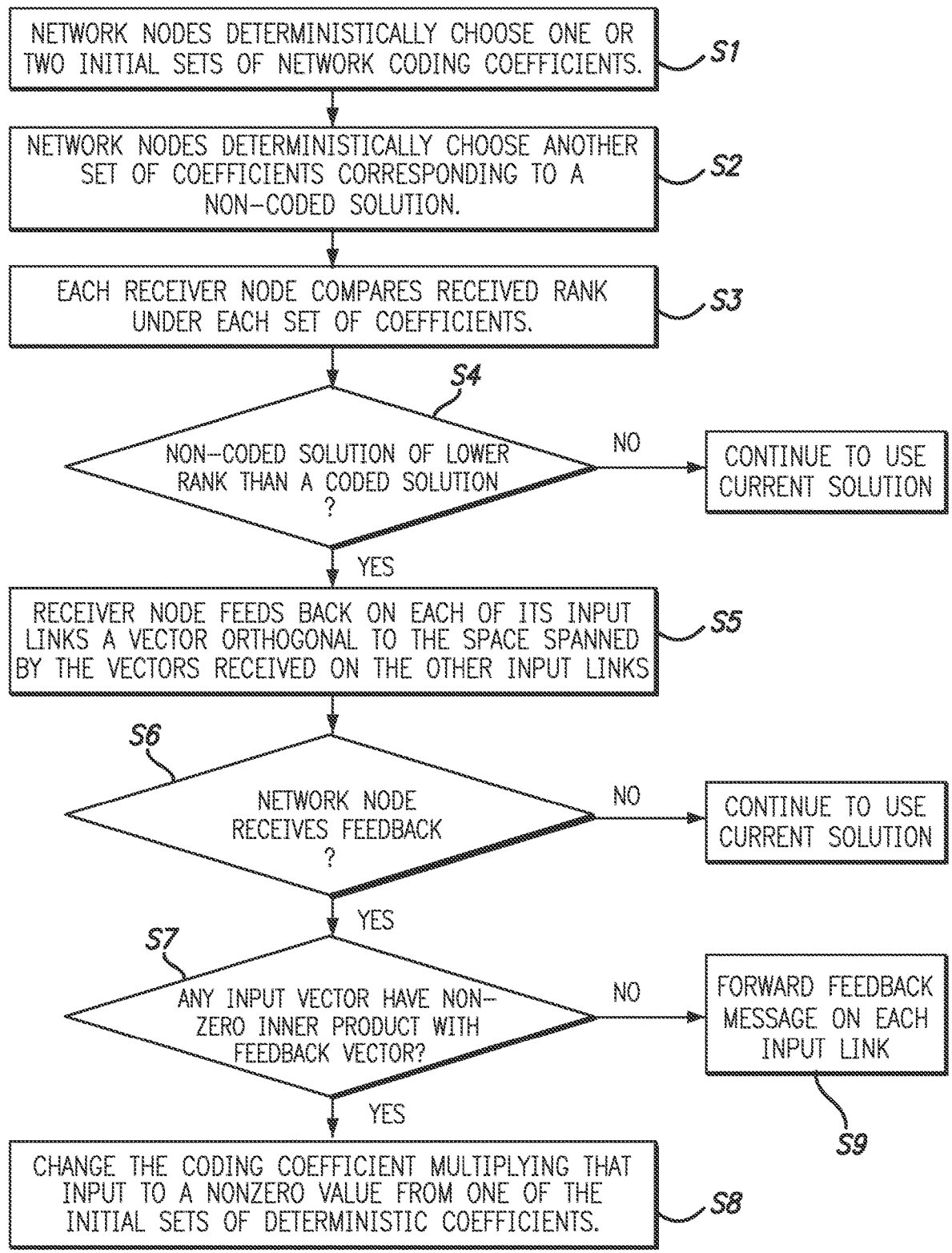
FIG. 6 shows a flow chart according to an embodiment of the present disclosure.

In one of such embodiments, shown in FIG. 6 in a flow chart format, the network nodes initially employ the approach of FIG. 4 or FIG. 5 to deterministically choose one or two sets of coefficients (step S1). The network nodes then deterministically choose another set of coefficients corresponding to a non-coded solution (step S2), using for example a standard routing algorithm like the one mentioned in the above paragraph. Each receiver node compares the rank of its received vectors under each of the sets of coefficients (step S3). If the non-coded solution results in lower rank than one of the coded solutions, the receiver node feeds back on each of its input links a vector orthogonal to the space spanned by the vectors received on the other input links (steps S4 and S5). Each coding node receiving such feedback checks to see if any of its input vectors has a nonzero inner product with the feedback vector (steps S6 and S7). If so, it changes the coding coefficient multiplying that input to a nonzero value corresponding to one of the initial sets of deterministic coefficients (step S8). If not, it forwards the feedback on its input links (step S9).

In other embodiments, only some nodes employ deterministic coding while other nodes may employ existing randomized coding techniques (such as those shown in the above mentioned U.S. Pat. No. 7,706,365) or no coding.

The management information comprised of the various linear combinations can be maintained and sent through the network, for each signal in the network, as a vector of scalar coefficients for each of the source processes, and updated at each coding node by applying the same linear combinations or mappings to the coefficient vectors as to the data or information signals.

The above embodiments can be generalized to vector linear coding, by considering each link as multiple parallel links of smaller capacity, and considering each source as multiple co-located sources of lower rate.

The above embodiments can also be generalized to convolutional network coding over subgraphs with cycles, by considering coding coefficients as polynomials in a delay variable.

The above embodiments can also be generalized to network codes in which different portions of the subgraph from source to sink employ linear network coding over different alphabets. In some embodiments, the alphabet becomes larger with the distance from the source. In other embodiments, one or more intermediate nodes decode messages and re-encode using a different field.

Figure 7:
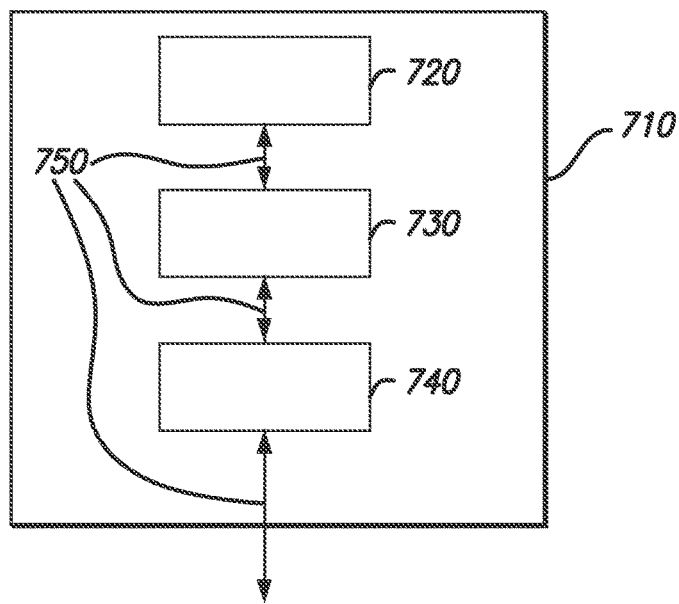
FIG. 7 shows a computer system configured to be used in accordance with the teachings of the present disclosure.

The methods and systems described in the present disclosure may be implemented in hardware, software, firmware or combination thereof. Features described as blocks, modules or components may be implemented together (e.g., in a logic device such as an integrated logic device) or separately (e.g., as separate connected logic devices). The software portion of the methods of the present disclosure may comprise a computer-readable medium which comprises instructions that, when executed, perform, at least in part, the described methods. The computer-readable medium may comprise, for example, a random access memory (RAM) and/or a read-only memory (ROM). The instructions may be executed by a processor (e.g., a digital signal processor (DSP), an application specific integrated circuit (ASIC), or a field programmable logic array (FPGA)) By way of example and not of limitation, as shown in FIG. 7, the present disclosure may be implemented in a computer system (710) comprising a memory (720), a processor (730), a communications interface (740) and an interconnection arrangement (750) coupling the memory, processor and the communications interface, wherein the memory is encoded with instructions utilizing network coding in accordance with the methods of the present disclosure.

While several illustrative embodiments of the invention have been shown and described in the above description, numerous variations and alternative embodiments will occur to those skilled in the art. Such variations and alternative embodiments are contemplated, and can be made without departing from the scope of the invention as defined in the appended claims.

The invention claimed is:

1. A network comprising:
one or more source nodes;
one or more receiver nodes; and
coding nodes, allowing communication of source processes to the one or more receiver nodes, the coding nodes being connected with input links for communication of input signals to the coding nodes and output links for communication of output signals from the coding nodes,
wherein the output signals from the coding nodes are a linear combination of the input signals,
a plurality of said coding nodes being configured to generate coefficients of the linear combination using local node numbers or alternatively local link numbers as inputs to a deterministic mapping from the local node numbers or alternatively from the local link numbers to the coefficients of the linear combination,
wherein the linear combination of processes transmitted from the one or more source nodes present in each signal in the network is specified as a vector of the coefficients, each coefficient corresponding to a process to be transmitted from the one or more source nodes, and
wherein said coding nodes are configured to update and to transmit the vector of coefficients by applying to the vector of coefficients linear combinations,
wherein the linear combinations applied to the vector of coefficients are the same as the linear combinations applied to data transmitted through the network.

2. The network of claim 1,
wherein said plurality of coding nodes are further configured to generate deterministically coefficients of the linear combination also on a local counter or clock signal.

3. The network of claim 1,
wherein said node numbers or link numbers are obtained from physical characteristics associated to the coding nodes or the node numbers or the link numbers are assigned in any deterministic order.

4. The network according to claim 1,
wherein the network further comprises bidirectional or reverse links and wherein the mapping is adjustable through feedback from the receiver nodes.

5. The network according to claim 1, further comprising routing nodes, the routing nodes being connected with input links for communication of input signals to the routing nodes and output links for communication of output signals from the routing nodes, wherein the output signals from a routing node are obtained through routing without coding of the input signals to the routing node.

6. The network according to claim 1,
wherein at least some deterministically chosen coefficients of an output signal of a first coding node along a first outgoing link of the first coding node are linearly independent from deterministically chosen coefficients of an output signal of the first coding node along a second outgoing link of the first coding node.

7. The network according to claim 1,
wherein at least some deterministically chosen coefficients of an output signal of a first coding node along an outgoing link of the first coding node are linearly independent from deterministically chosen coefficients of an output signal of a second coding node along an outgoing link of the second coding node.

8. The network according to claim 1,
wherein at least some deterministically chosen coefficients from a first output signal of a first coding node along an outgoing link of the first coding node at a first time are linearly independent from deterministically chosen coefficient from a second output signal of the first coding node along the outgoing link of the first coding node at a second time.

9. A method for transmitting processes from one or more sources to one or more receivers in a network, the method comprising:
providing coding nodes between the one or more sources and the one or more receivers;
providing, for each coding node, input links for transmitting input signals to the coding node, and output links for transmitting output signals from the coding node, the output signals being a linear combination of the input signals; and
generating at a plurality of said coding nodes coefficients of the linear combination using local node numbers or alternatively local link numbers as inputs to a deterministic mapping from the local node numbers or alternatively from the local link numbers to the coefficients of the linear combination,
wherein the linear combination of processes transmitted from the one or more sources present in each signal in the network is specified as a vector of the coefficients, each coefficient corresponding to a process to be transmitted from the one or more sources, and
wherein the vector of coefficients is transmitted through the network and updated at said coding nodes by applying to the vector of coefficients linear combinations,
wherein the linear combinations applied to the vector of coefficients are the same as the linear combinations applied to data transmitted through the network.

10. The method according to claim 9, comprising the step of generating deterministically, at said plurality of coding nodes, coefficients of the linear combination also on a local counter or clock signal.

11. The method according to claim 9,
wherein said node numbers or link numbers are obtained from physical characteristics associated to the coding node or the node numbers or the link numbers are assigned in any deterministic order.

12. The method according to claim 9,
wherein the network further comprises bidirectional or reverse links and wherein the mapping is adjustable through feedback from the receiver nodes.

13. The method according to claim 9, further comprising providing routing nodes, the routing nodes being connected with input links for communication of input signals to the routing nodes and output links for communication of output signals from the routing nodes,
wherein the output signals from a routing node are obtained through routing without coding of the input signals to the routing node.

14. The method according to claim 9,
wherein at least some deterministically locally generated coefficients of an output signal of a first coding node along a first outgoing link of the first coding node are linearly independent from deterministically locally generated coefficients of an output signal of the first coding node along a second outgoing link of the first coding node.

15. The method according to claim 9,
wherein at least some deterministically locally generated coefficients of an output signal of a first coding node along an outgoing link of the first coding node are linearly independent from deterministically locally generated coefficients of an output signal of a second coding node along an outgoing link of the second coding node.

16. The method according to claim 9,
wherein at least some deterministically locally generated coefficients from a first output signal of a first coding node along an outgoing link of the first coding node at a first time are linearly independent from deterministically locally generated coefficient from a second output signal of the first coding node along the outgoing link of the first coding node at a second time.

17. A network comprising:
one or more source nodes;
one or more receiver nodes; and
coding nodes, allowing communication of source processes to the one or more receiver nodes, the coding nodes being connected with input links for communication of input signals to the coding nodes and output links for communication of output signals from the coding nodes,
wherein the output signals from the coding nodes are a linear combination of the input signals,
a plurality of said coding nodes being configured to generate coefficients of the linear combination using local node numbers or alternatively local link numbers as inputs to a deterministic mapping from the local node numbers or alternatively from local link numbers to the coefficients of the linear combination,
wherein said mapping is a modular operation, said coding nodes being configured to generate said coefficients as a linear combination mod q of the local node numbers or alternatively of the local link numbers, wherein q is a constant,
the linear combination of processes transmitted from the one or more source nodes present in each signal in the network is specified as a vector of the coefficients, each coefficient corresponding to a process to be transmitted from the one or more source nodes, and
wherein said coding nodes are configured to update and to transmit the vector of coefficients by applying to the vector of coefficients linear combinations, wherein the linear combinations applied to the vector of coefficients are the same as the linear combinations applied to data transmitted through the network.

* * * * *